United States Patent
Yano et al.

[11] Patent Number: 5,939,848
[45] Date of Patent: Aug. 17, 1999

[54] CONTROL SYSTEM FOR HYBRID VEHICLE

[75] Inventors: Toru Yano; Yutaka Tamagawa; Yoshikazu Oshima; Motoshi Ishikawa, all of Wako, Japan

[73] Assignee: Honda Giken Kogyo Kabushiki Kaisha, Tokyo, Japan

[21] Appl. No.: 09/153,924

[22] Filed: Sep. 16, 1998

[30] Foreign Application Priority Data

Sep. 17, 1997 [JP] Japan ................................ 9-269190

[51] Int. Cl.$^6$ .............................. H02P 9/00; B60K 6/00
[52] U.S. Cl. ....................... 318/139; 318/141; 318/153; 180/65.4; 180/65.5; 322/13; 322/18
[58] Field of Search .................................. 318/139, 140, 318/141, 153; 180/65.4, 65.3, 65.5, 65.6, 65.7; 322/13, 18, 14; 290/16, 17, 45, 50

[56] References Cited

U.S. PATENT DOCUMENTS

| | | | |
|---|---|---|---|
| 5,561,362 | 10/1996 | Kawamura et al. | 320/48 |
| 5,608,308 | 3/1997 | Kiuchi et al. | 322/11 |
| 5,614,809 | 3/1997 | Kiuchi et al. | 322/11 |
| 5,621,304 | 4/1997 | Kiuchi et al. | 322/18 |
| 5,664,635 | 9/1997 | Koga et al. | 180/65.3 |

FOREIGN PATENT DOCUMENTS

5-229351  9/1993  Japan .

*Primary Examiner*—Paul Ip
*Attorney, Agent, or Firm*—Nikaido, Marmelstein, Murray & Oram LLP

[57] ABSTRACT

A control system controls a hybrid vehicle having an engine for rotating a drive axle, an electric motor for assisting the engine in rotating the drive axle, and electric energy storage unit for supplying electric energy to the electric motor. The control system includes a demand drive power calculating unit for calculating a demand drive power for the hybrid vehicle depending on operating conditions of the hybrid vehicle, an engine output power calculating unit for calculating an output power of the engine which corresponds to the demand drive power, a remaining capacity detecting unit for detecting a remaining capacity of the electric energy storage unit, an electric motor output power calculating unit for calculating an output power of the electric motor depending on the demand drive power and the remaining capacity of the electric energy storage unit, and an engine corrective quantity calculating unit for calculating a corrective quantity to reduce the output power of the engine in order to equalize the sum of the calculated output power of the electric motor and the calculated output power of the engine to the demand drive power. An output control unit controls a drive power of the electric motor based on the calculated output power of the electric motor and reducing the output power of the engine based on the calculated corrective quantity.

14 Claims, 11 Drawing Sheets

| THROTTLE VALVE OPENING COMMAND θthCOM (DEGREES) ↓ | NE (rpm) → | | | | | |
|---|---|---|---|---|---|---|
| | | 0 | 500 | | 9500 | 10000 |
| | 0 | | | | | |
| | 1 | | | | | |
| | ⋮ | | | DEMAND DRIVE POWER POWERcom (KW) | | |
| | 89 | | | | | |
| | 90 | | | | | |

FIG. 11

| EXTRA OUTPUT POWERex (KW) ↓ | VEHICLE SPEED (Km/h) → | | | | | |
|---|---|---|---|---|---|---|
| | | 0 | 10 | | 160 | 170 |
| | 0 | | | | | |
| | 1 | | | | | |
| | ⋮ | | | RUNNING STATUS QUANTITY VSTATUS (%) | | |
| | 99 | | | | | |
| | 100 | | | | | |

CONTROL SYSTEM FOR HYBRID VEHICLE

BACKGROUND OF THE INVENTION

1. Field of the Invention

The present invention relates to a control system for controlling a hybrid vehicle having an internal combustion engine and an electric motor as separate propulsion sources.

2. Description of the Related Art

There have heretofore been known hybrid vehicles each having an internal combustion engine and an electric motor as separate propulsion sources. Japanese laid-open patent publication No. 5-229351, for example, discloses a drive power control system for propulsion sources on such a hybrid vehicle.

The disclosed drive power control system determines an optimum torque for maximizing the efficiency of the engine depending on running conditions of the vehicle, detects an actual drive torque of the engine, and determines an assistive drive torque based on the optimum torque and the actual torque. The drive power control system energizes the electric motor to apply an assistive power at suitable times as when the vehicle is to be accelerated, depending on the assistive drive torque.

The electric motor applies the assistive power by simply adding the output power of the electric motor depending on the remaining capacity of an electric energy storage unit based on the difference between the optimum torque and the actual torque which are generated by a throttle valve opening that is uniquely determined depending on the driver's action to operate the accelerator pedal. For this reason, the drive power control system suffers the following problems:

When the remaining capacity of the electric energy storage unit falls and hence the output power of the electric motor drops, the total drive power, i.e., the sum of the output power from the engine and the output power from the electric motor, is reduced, resulting in a reduction in the actual torque. Accordingly, the drivability of the hybrid vehicle is impaired.

One solution is to replace an ordinary throttle valve mechanically linked to the accelerator pedal with a throttle valve that is electrically controlled by an actuator based on a signal indicative of the amount of operation of the accelerator pedal. When the output power from the electric motor drops, the opening of the throttle valve is controlled to enable the engine to generate an output power commensurate with the drop in the output power from the electric motor. The proposal is effective to prevent the drivability of the hybrid vehicle from being impaired, but is disadvantageous for the following reasons:

One advantage offered by the assistive drive power provided by the electric motor is to reduce the amount of fuel consumption by the engine. Specifically, a demand drive power imposed on a motor vehicle which is propelled by an engine alone is entirely generated by the engine. However, a demand drive power imposed on a hybrid vehicle which is propelled by an engine and an electric motor is partly generated by the engine and partly generated by the electric motor. The greater the amount of the demand drive power shared by the electric motor, the smaller the amount of the demand drive power shared by the engine, i.e., the smaller the amount of work performed by the engine, resulting in a reduction in the amount of fuel consumption by the engine. In the conventional drive power control system described above, the torque generated by the engine is maintained at an optimum level regardless of the remaining capacity of the electric energy storage unit, and hence the advantage of the hybrid vehicle that the amount of work performed by the engine can be reduced to reduce the amount of fuel consumption by the engine is limited.

In the above conventional drive power control system, since the output power of the engine is determined depending on the throttle valve opening, the engine maintains a certain amount of output power at all times except when the throttle valve is fully closed. This mode of operation remains unchanged even when the electric energy storage unit stores an amount of electric energy sufficient enough to enable the electric motor to generate all the demand drive power. Therefore, even when the electric energy storage unit stores such a sufficient amount of electric energy, the electric motor does not generate all the demand drive power, and hence the amount of work performed by the engine cannot be eliminated completely.

SUMMARY OF THE INVENTION

It is therefore an object of the present invention to provide a control system for calculating an output power of an electric motor on a hybrid vehicle based on a demand drive power and the remaining capacity of an electric energy storage unit, and correcting an output power of an engine on the hybrid vehicle based on the demand drive power and the calculated output power of the electric motor for increasing drivability of the hybrid vehicle and reducing an amount of fuel consumption by the engine.

To achieve the above object, there is provided in accordance with the present invention a control system for controlling a hybrid vehicle having an engine for rotating a drive axle, an electric motor for assisting the engine in rotating the drive axle, and electric energy storage means for supplying electric energy to the electric motor, comprising demand drive power calculating means for calculating a demand drive power for the hybrid vehicle depending on operating conditions of the hybrid vehicle, engine output power calculating means for calculating an output power of the engine which corresponds to the demand drive power, remaining capacity detecting means for detecting a remaining capacity of the electric energy storage means, electric motor output power calculating means for calculating an output power of the electric motor depending on the demand drive power and the remaining capacity of the electric energy storage means, engine corrective quantity calculating means for calculating a corrective quantity to reduce the output power of the engine in order to equalize the sum of the calculated output power of the electric motor and the calculated output power of the engine to the demand drive power, and output control means for controlling a drive power of the electric motor based on the calculated output power of the electric motor and reducing the output power of the engine based on the calculated corrective quantity.

The electric motor output power calculating means comprises means for calculating an output power of the electric motor depending on a running status quantity determined by the demand drive power, the remaining capacity of the electric energy storage means, a vehicle speed of the hybrid vehicle, and a running resistance to the hybrid vehicle.

The output control means comprises means for generating the demand drive power solely with the electric motor when the calculated demand drive power is at most the calculated output power of the electric motor.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
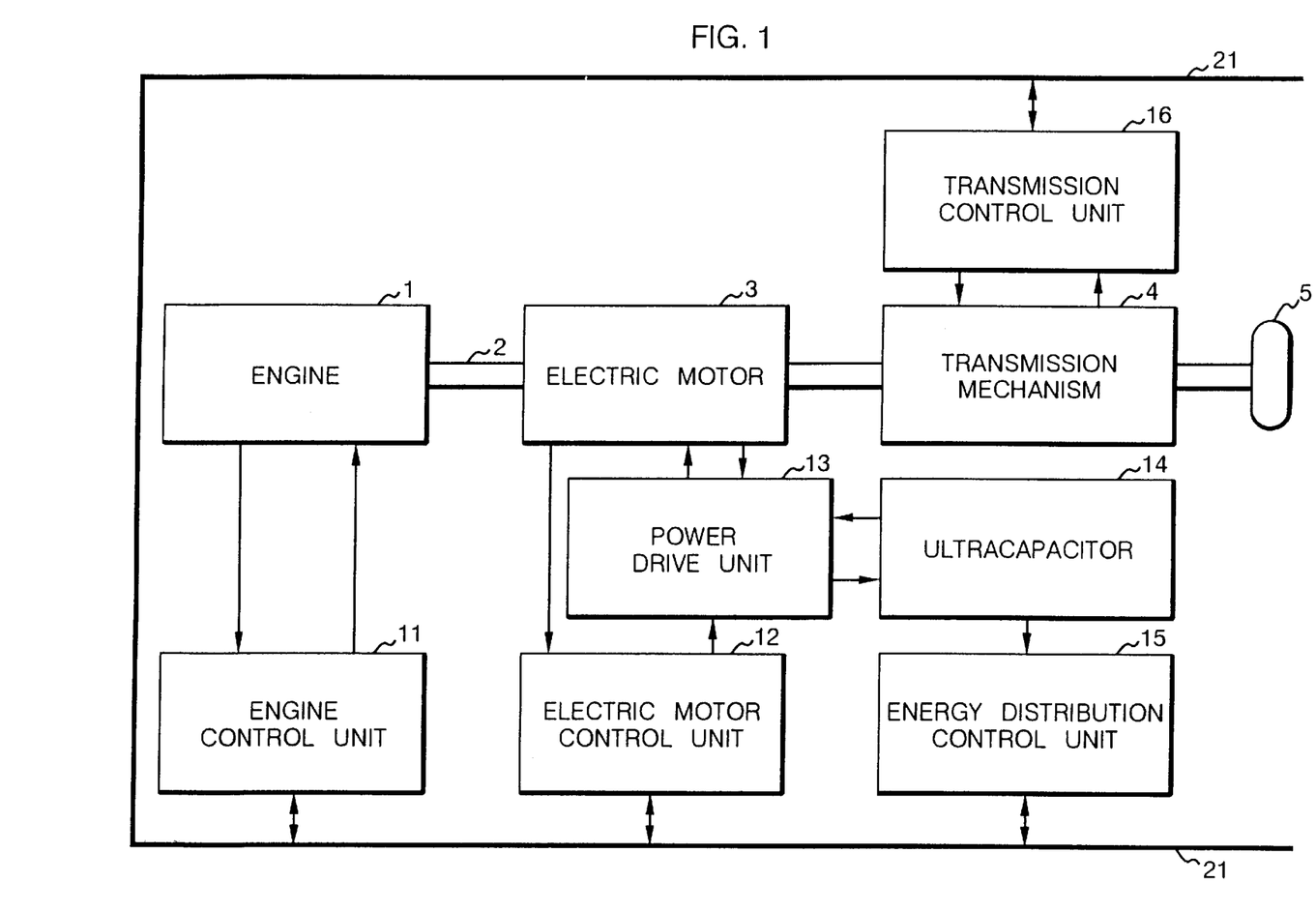
FIG. 1 is a block diagram of a drive apparatus of a hybrid vehicle and a control system therefor according to the present invention.

FIG. 1 shows in block form a drive apparatus of a hybrid vehicle and a control system therefor according to the present invention. Other components of the hybrid vehicle, including sensors, actuators, etc., are omitted from illustration in FIG. 1.

As shown in FIG. 1, the hybrid vehicle has a multicylinder internal combustion engine 1 which rotates a drive axle 2 for rotating drive wheels 5 (only one shown) through a transmission mechanism 4. An electric motor 3 is connected to rotate the drive axle 2 directly. In addition to the ability to rotate the drive axle 2, the electric motor 3 has a regenerative ability to convert kinetic energy produced by the rotation of the drive axle 2 into electric energy. The electric motor 3 is connected to an ultracapacitor (a capacitor having a large electrostatic capacitance) 14 serving as an electric energy storage unit through a power drive unit 13. The electric motor 3 is controlled by the power drive unit 13 to rotate the drive axle 2 and generate electric energy in a regenerative mode.

The control system also has an engine control unit 11 for controlling the engine 1, an electric motor control unit 12 for controlling the electric motor 3, an energy distribution control unit 15 for carrying out energy management based on a determined status of the ultracapacitor 14, and a transmission control unit 16 for controlling the transmission mechanism 4. The engine control unit 11, the electric motor control unit 12, the energy distribution control unit 15, and the transmission control unit 16 are connected to each other through a data bus 21 for exchanging detected data, flags, and other information.

Figure 2:
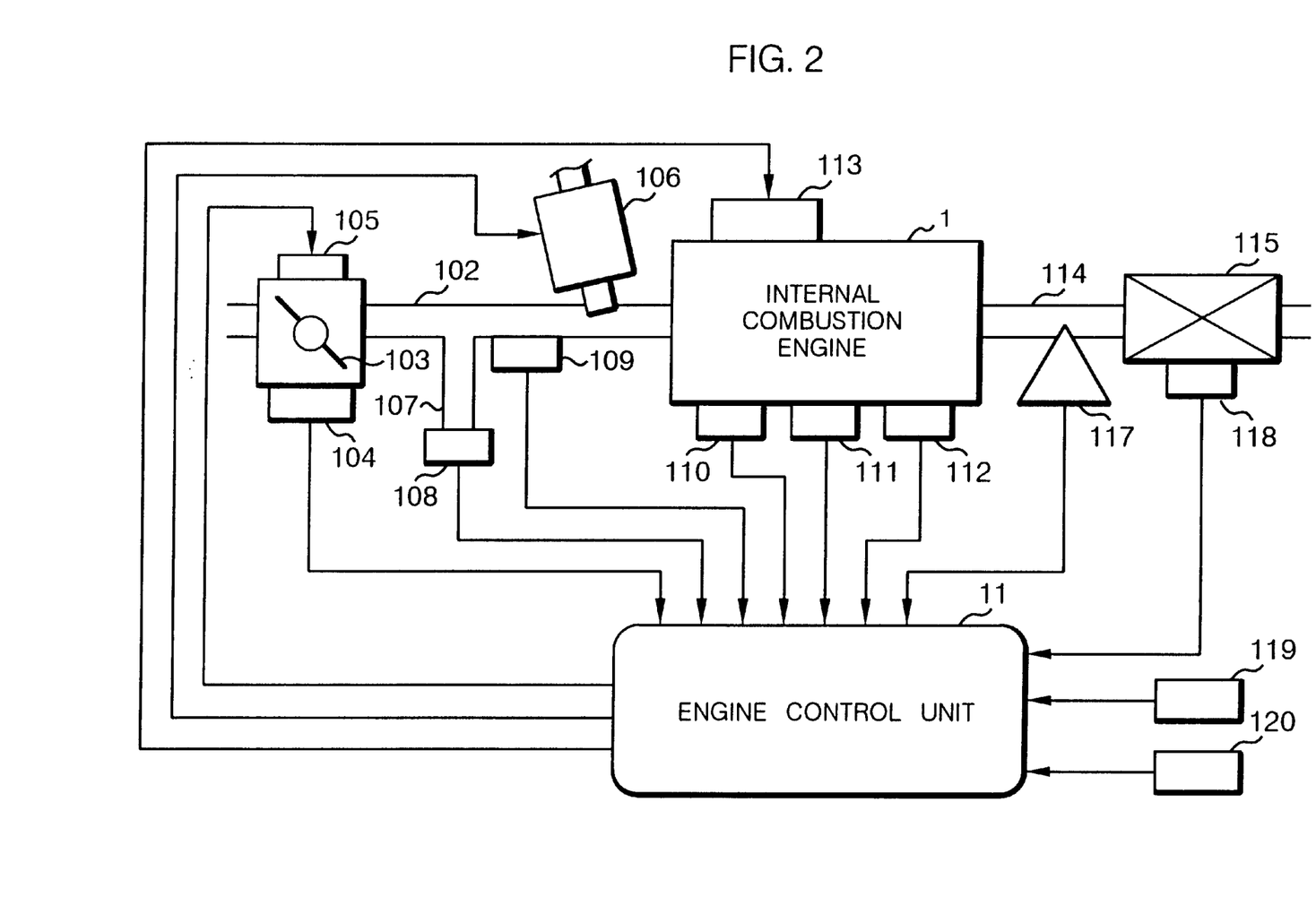
FIG. 2 is a block diagram of an engine control arrangement of the control system.

FIG. 2 shows the engine 1, the engine control unit 11, and ancillary devices thereof. A throttle valve 103 is mounted in an intake pipe 102 connected to the engine 1, and a throttle valve opening sensor 104 is coupled to the throttle valve 103 for generating an electric signal representative of the opening of the throttle valve 103 and supplying the generated electric signal to the engine control unit 11. A throttle actuator 105 for electrically controlling the opening of the throttle valve 103 is coupled to the throttle valve 103. The throttle actuator 105 is controlled for its operated by the engine control unit 11.

Fuel injection valves 106 are mounted in the intake pipe 102 at respective positions downstream of the throttle valve 103 and slightly upstream of respective intake valves (not shown) disposed respectively in the cylinders of the engine 1. The fuel injection valves 106 are connected through a pressure regulator (not shown) to a fuel tank (not shown). The fuel injection valves 106 are electrically connected to the engine control unit 11, which applies signals to the fuel injection valves 106 to control times to open and close the fuel injection valves 106.

An intake pipe absolute pressure (Pba) sensor 108 is connected to the intake pipe 102 through a pipe 107 immediately downstream of the throttle valve 103. The intake pipe absolute pressure sensor 108 generates an electric signal representative of an absolute pressure in the intake pipe 102, and supplies the generated signal to the engine control unit 11.

An intake temperature sensor 109 is mounted on the intake pipe 102 downstream of the intake pipe absolute pressure sensor 108. The intake temperature sensor 109 generates an electric signal representative of the temperature of intake air flowing in the intake pipe 102 and supplies the generated signal to the engine control unit 11. An engine coolant temperature sensor 110, which may comprises a thermistor or the like, is mounted on the cylinder block of the engine 1. The engine coolant temperature sensor 110 generates an electric signal representative of the engine coolant temperature and supplies the generated signal to the engine control unit 11.

An engine rotational speed (NE) sensor 111 is mounted near a camshaft or crankshaft (not shown) of the engine 1. The engine rotational speed sensor 111 generates a signal pulse at a predetermined crankshaft angle (hereinafter referred to as a "TDC signal pulse") each time the crankshaft of the engine 1 makes a 180° turn, and supplies the TDC signal pulse to the engine control unit 11.

The engine 1 has ignition plugs 113 positioned at the respective cylinders and electrically connected to the engine control unit 11, which controls the ignition timing of the ignition plugs 113.

A three-way catalytic converter 115 for purifying toxic components, including HC, CO, NOx, etc. of exhaust gases emitted from the engine 1 is mounted in an exhaust pipe 114 connected to the engine 1. An air-fuel ratio sensor 117 is mounted on the exhaust pipe 114 upstream of the three-way catalytic converter 115. The air-fuel ratio sensor 117 generates an electric signal substantially proportional to the concentration of oxygen (and the shortage of oxygen) in the exhaust gases, and supplies the generated signal to the engine control unit 11. The air-fuel ratio sensor 117 can detect the air-fuel ratio of an air-fuel mixture supplied to the engine 1 through a wide range of air-fuel ratios ranging from a theoretical air-fuel ratio to lean and rich values.

A catalyst temperature sensor 118 is mounted on the three-way catalytic converter 115 for detecting the temperature thereof. The catalyst temperature sensor 118 supplies an electric signal representative of the detected temperature to the engine control unit 11. A vehicle speed sensor 119 for detecting the speed Vcar of the hybrid vehicle and an accelerator opening sensor 120 for detecting the depression (hereinafter referred to as an "accelerator opening") θap of the accelerator pedal are electrically connected to the engine control unit 11. Electric signals generated by the vehicle speed sensor 119 and the accelerator opening sensor 120 are supplied to the engine control unit 11.

A sensor 112 is mounted on the internal combustion engine 1 for generating a pulse each time the crankshaft turns through a predetermined angle. A pulse signal generated by the sensor 112 is supplied to the engine control unit 11, which identifies an engine cylinder into which fuel is to be injected, based on the supplied pulse signal.

The engine control unit 11 comprises an input circuit for shaping the waveforms of input signals from the above various sensors, correcting the voltage levels thereof into predetermined levels, and converging analog signals into digital signals, a central processing unit (hereinafter referred to as a "CPU"), a memory for storing various processing programs to be executed by the CPU and various processed results, and an output circuit for supplying drive signals to the fuel injection valves 106 and the ignition plugs 113. The other control units including the electric motor control unit 12, the energy distribution control unit 15, and the transmission control unit 16 are structurally similar to the engine control unit 11.

Figure 3:
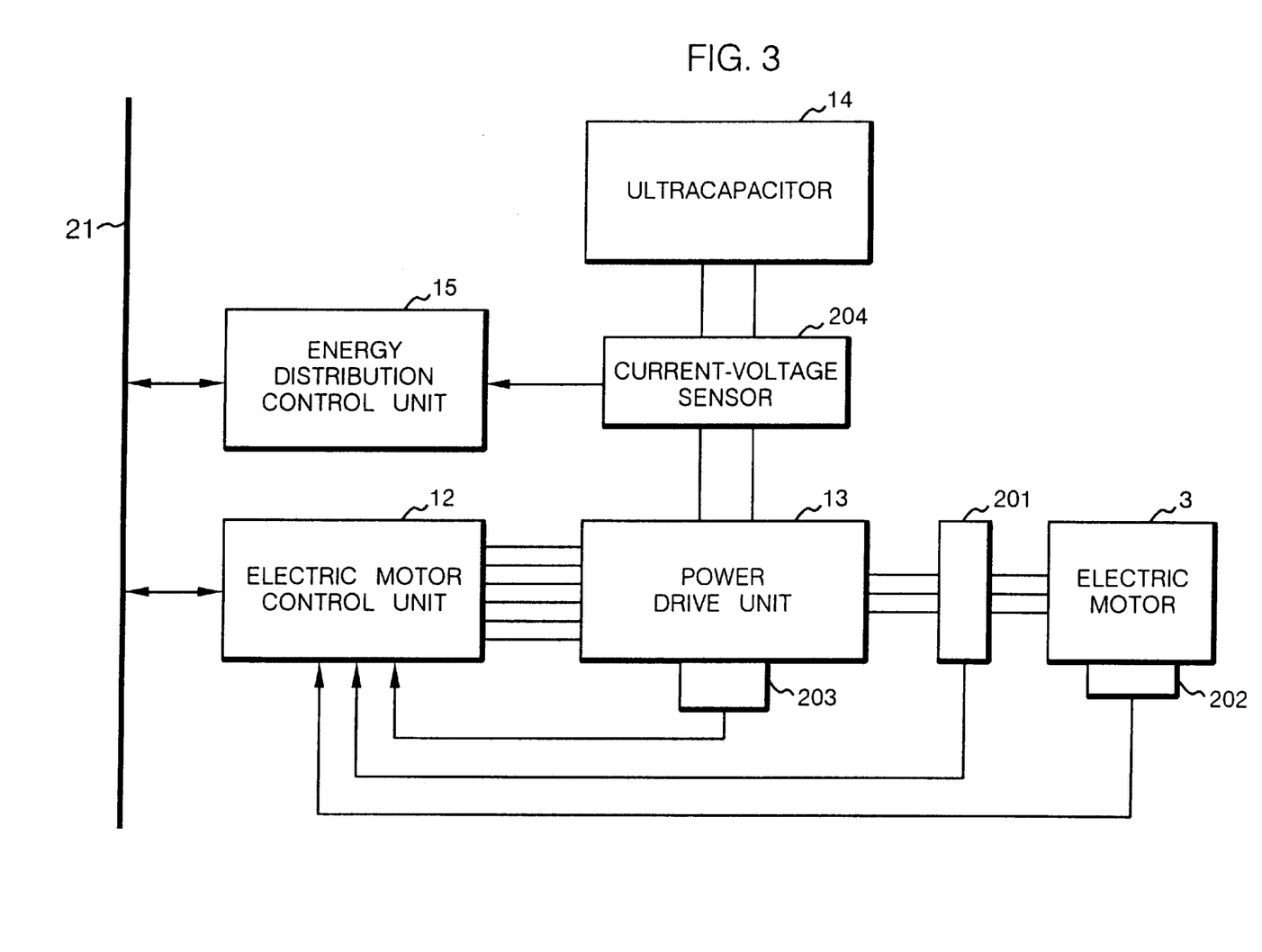
FIG. 3 is a block diagram of an electric motor control arrangement of the control system.

FIG. 3 shows a connected arrangement of the electric motor 3, the power drive unit 13, the ultracapaci-tor 14, the electric motor control unit 12, and the energy distribution control unit 15.

As shown in FIG. 3, the electric motor 3 is associated with an electric motor rotational speed sensor 202 for detecting the rotational speed of the electric motor 3. An electric signal generated by the electric motor rotational speed sensor 202 as representing the rotational speed of the electric motor 3 is supplied to the electric motor control unit 12. The power drive unit 13 and the electric motor 3 are interconnected by wires connected to a current-voltage sensor 201 which detects a voltage and a current supplied to or outputted from the electric motor 3. A temperature sensor 203 for detecting the temperature of the power drive unit 13, more specifically, the temperature TD of a protective resistor of a drive circuit for the electric motor 3, is mounted on the power drive unit 13. Detected signals from the sensors 201, 203 are supplied to the electric motor control unit 12.

The ultracapacitor 14 and the power drive unit 13 interconnected by wires connected to a current-voltage sensor 204 for detecting a voltage across the ultracapacitor 14 and a current outputted from or supplied to the ultracapacitor 14. A detected signal from the current-voltage sensor 204 is supplied to the energy distribution control unit 15.

Figure 4:
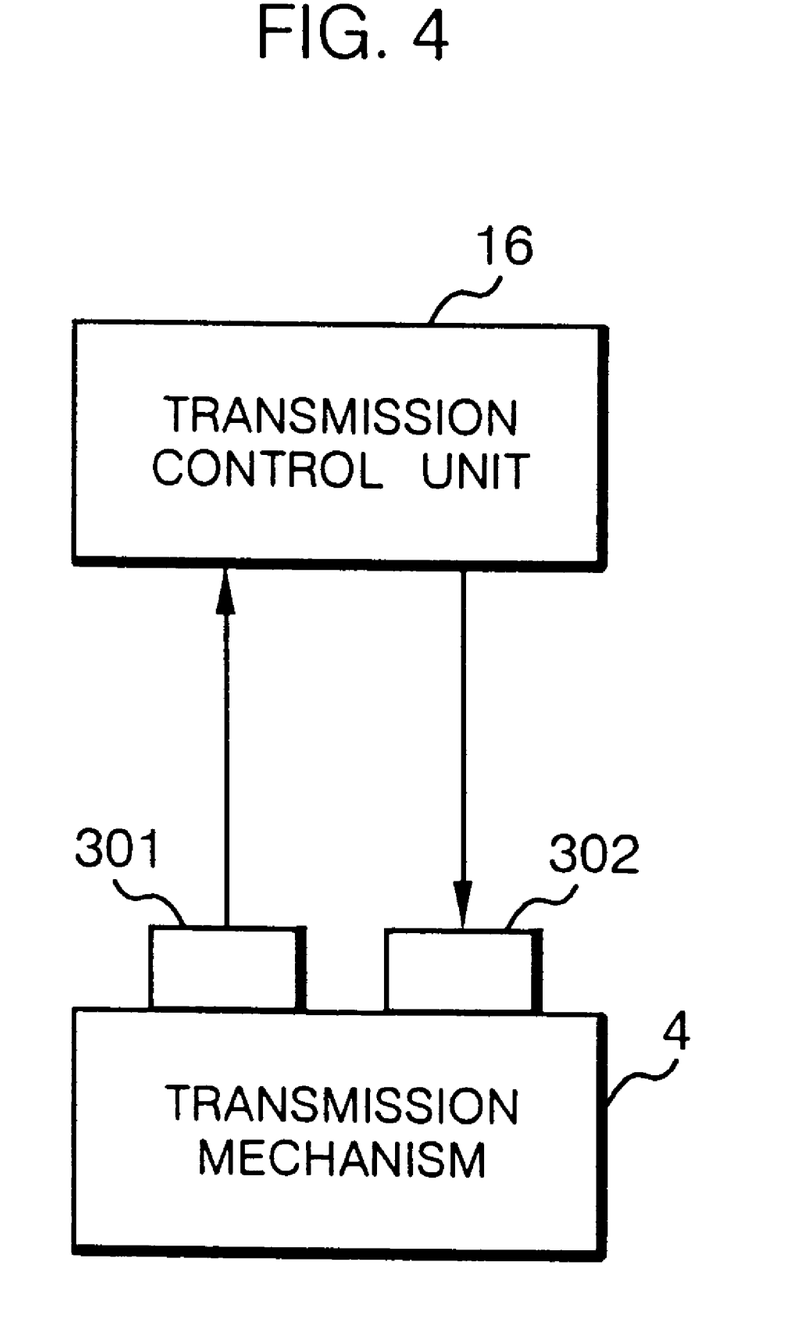
FIG. 4 is a block diagram of a transmission control arrangement of the control system.

FIG. 4 shows a connected arrangement of the transmission mechanism 4 and the transmission control unit 16. The transmission mechanism 4 is associated with a gear position sensor 301 for detecting a gear position of the transmission mechanism 4. A detected signal from the gear position sensor 301 is supplied to the transmission control unit 16. In the illustrated embodiment, the transmission mechanism 4 comprises an automatic transmission mechanism, and is also associated with a transmission actuator 302 which is controlled by the transmission control unit 16 to change gear positions of the transmission mechanism 4.

Figure 5:
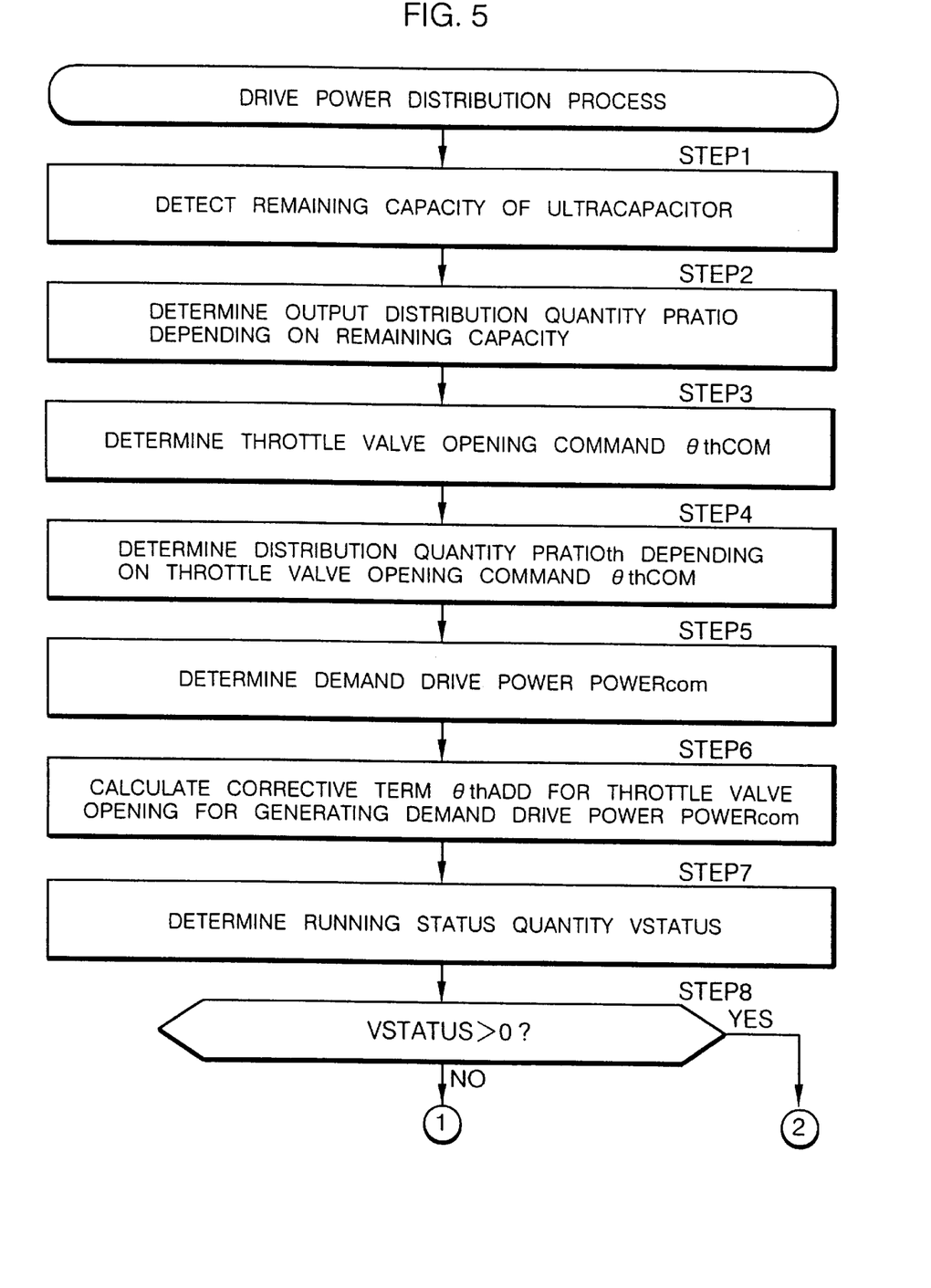
FIGS. 5 and 6 are a flowchart of a processing sequence for calculating an output power to be generated an electric motor, and determining output power distributions for the electric motor and an engine with respect to a demand drive power.
Figure 6:
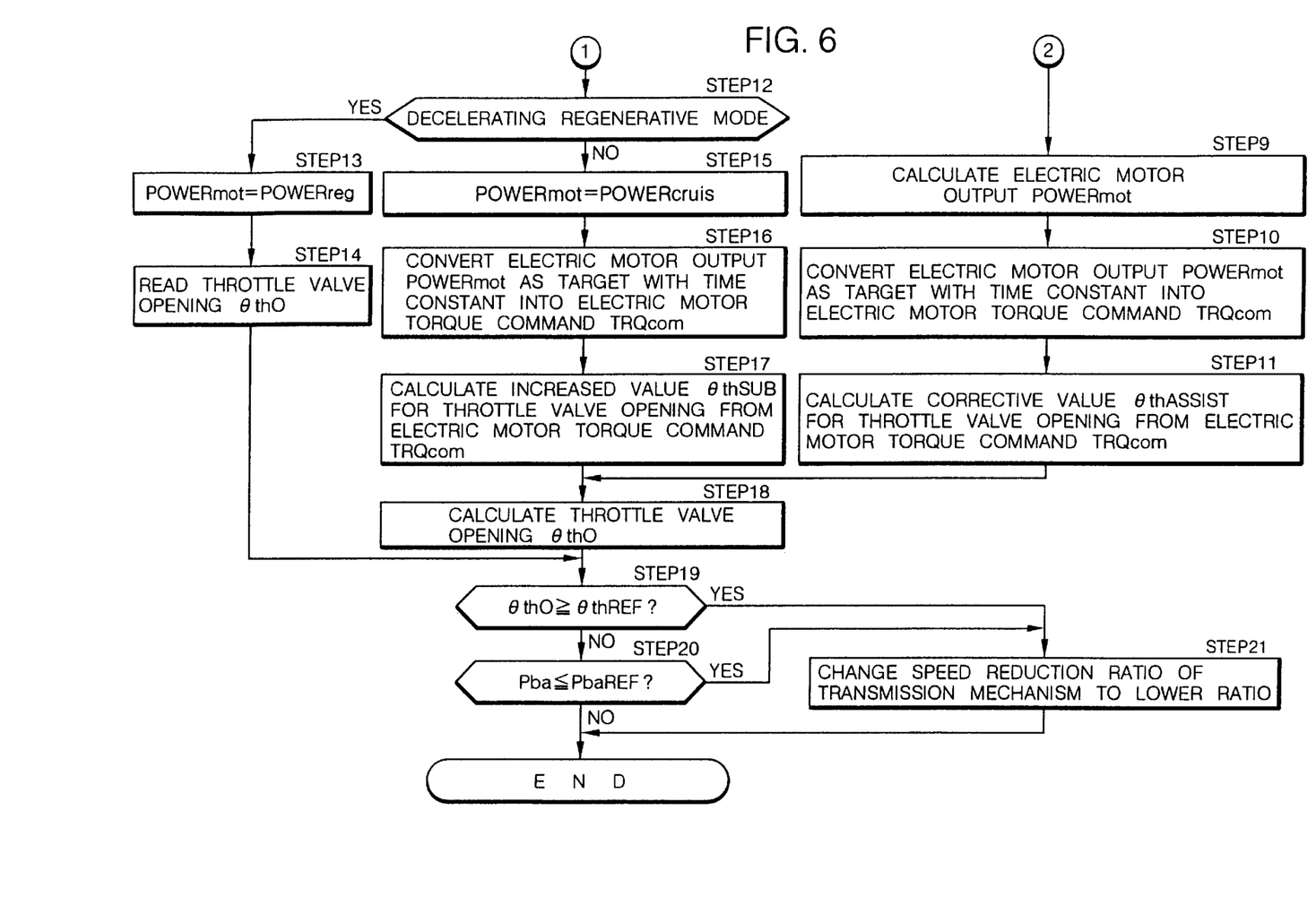

FIGS. 5 and 6 shows a processing sequence for calculating an output power to be generated by the electric motor 3 based on a demand drive power, i.e., a drive power which the drive of the hybrid vehicle demands, and determining output power distributions for the electric motor 3 and the engine 1 with respect to the demand drive power. The processing sequence shown in FIGS. 5 and 6 is executed by the energy distribution control unit 15 in each periodic cycle.

In FIG. 5, the energy distribution control unit 15 detects a remaining capacity of the ultracapacitor 14 in STEP1. Specifically, the energy distribution control unit 15 integrates an output current from the ultracapacitor 14 and an output current (charging current) to the ultracapacitor 14 at each periodic interval, and calculates an integrated discharged value CAPdis (positive value) and an integrated charged value CAPchg (negative value). The energy distribution control unit 15 then calculates a remaining capacity CAPrem of the ultracapacitor 14 according to the following equation (1):

$$CAPrem=CAPful-(CAPdis+CAPchg) \quad (1)$$

where CAPful represents a dischargeable quantity when the ultracapacitor 14 is fully charged.

The energy distribution control unit 15 corrects the calculated remaining capacity CAPrem based on an internal resistance of the ultracapacitor 14 which varies with temperature, etc., thereby determining a final remaining capacity of the ultracapacitor 14.

Instead of calculating the remaining capacity of the ultracapacitor 14 as described above, the remaining capacity of the ultracapacitor 14 may be determined by detecting an open-circuit voltage across the ultracapacitor 14.

In STEP2, the energy distribution control unit 15 determines an output power distribution quantity for the electric motor 3, i.e., a drive power PRATIO to be generated by the electric motor 3, of a demand drive power POWERcom, using an output power distribution ratio table. The drive power PRATIO is expressed as a ratio to the demand drive power, and will hereinafter be referred to as a "distribution ratio PRATIO".

Figure 7:
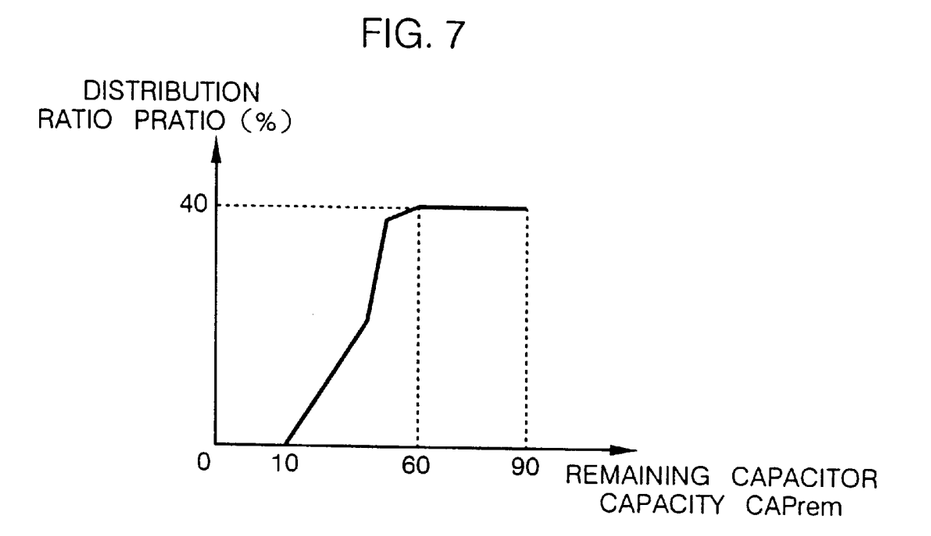
FIG. 7 is a diagram showing the relationship between the remaining capacity of an electric energy storage unit and the output power distribution of the electric motor.

FIG. 7 shows the output power distribution ratio table by way of example. The output power distribution ratio table is in the form of a graph having a horizontal axis which represents the remaining capacity of the ultracapacitor 14 and a vertical axis which represents the distribution ratio PRATIO. The output power distribution ratio table contains predetermined distribution ratios PRATIO with respect to remaining capacities, where the charging and discharging efficiency of the ultracapacitor 14 is maximum.

In STEP3, the energy distribution control unit 15 determines a command (hereinafter referred to as a "throttle valve opening command") θthCOM for the throttle actuator 105, corresponding to an accelerator opening θap detected by the accelerator opening sensor 120, from an accelerator vs. throttle characteristic table shown in FIG. 8.

Figure 8:
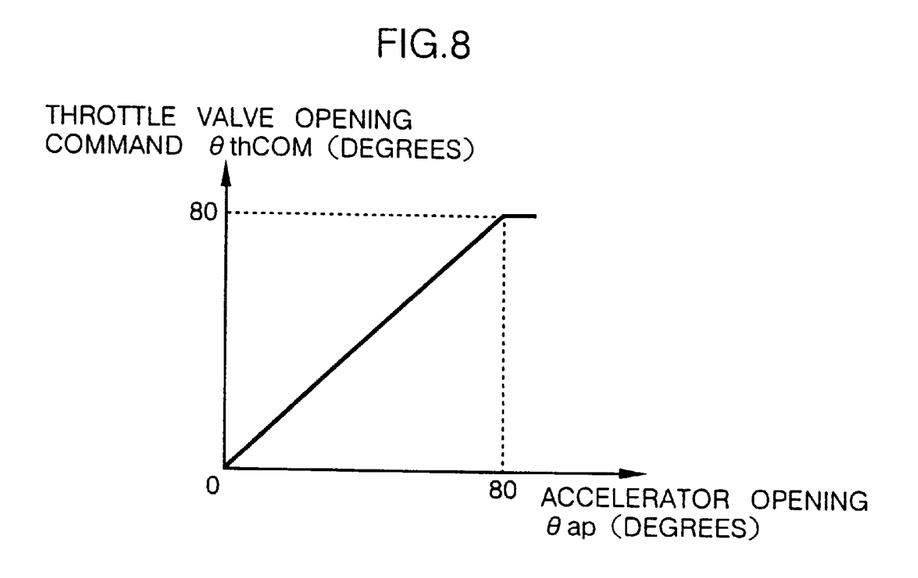
FIG. 8 is a diagram showing the relationship between the amount of operation of an accelerator pedal and the opening of a throttle valve.

The accelerator vs. throttle characteristic table shown in FIG. 8 is in the form of a graph having a horizontal axis which represents the accelerator opening θap and a vertical axis which represents the throttle valve opening command θthCOM. In FIG. 8, values of the accelerator opening θap are equal to corresponding values of the throttle valve opening command θthCOM. However, values of the accelerator opening θap may be different from corresponding values of the throttle valve opening command θthCOM.

Figure 9:
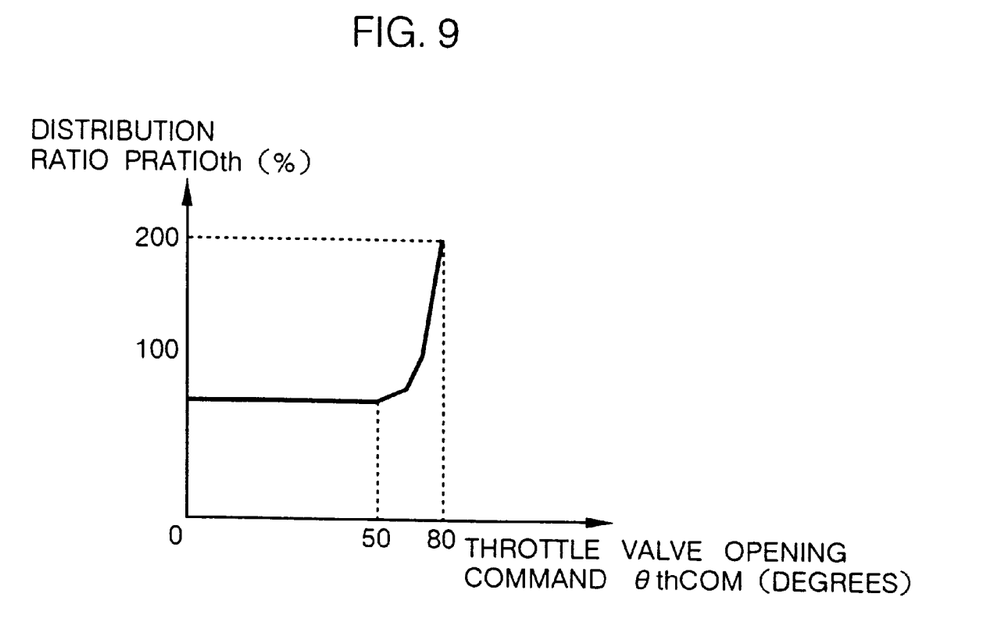
FIG. 9 is a diagram showing the relationship between the opening of the throttle valve and the output power distribution of the electric motor.

In STEP4, the energy distribution control unit 15 determines a distribution ratio PRATIOth for the electric motor 3 corresponding to the determined throttle valve opening command θthCOM from a throttle vs. motor output power ratio table shown in FIG. 9.

The throttle vs. motor output power ratio table shown in FIG. 9 is in the form of a graph having a horizontal axis which represents the throttle valve opening command θthCOM and a vertical axis which represents the distribution ratio PRATIOth. In FIG. 9, the throttle vs. motor output power ratio table is established such that the output power, which is indicated by the distribution ratio PRATIOth, generated by the electric motor 3 is increased when the throttle valve opening command θthCOM is 50 degrees or higher, for example.

While the distribution ratio PRATIOth is determined depending on the throttle valve opening command θthCOM in the illustrated embodiment, the distribution ratio PRATIOth may be determined depending on one or more parameters representing the vehicle speed, the engine rotational speed, etc.

Figure 10:
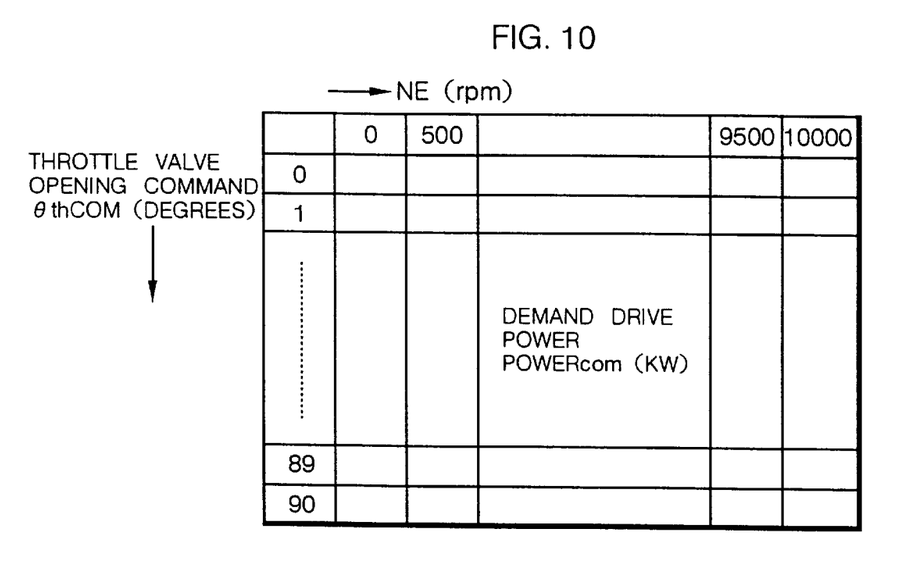
FIG. 10 is a diagram showing a table for establishing demand drive powers.

In STEP5, the energy distribution control unit 15 determines a demand drive power POWERcom depending on the throttle valve opening command θthCOM and the engine rotational speed NE from a demand drive power map shown in FIG. 10.

The demand drive power map shown in FIG. 10 is a map for determining a demand drive power POWERcom which the driver of the hybrid vehicle demands. The demand drive power map shown in FIG. 10 contains values of the demand drive power POWERcom depending on values of the throttle valve opening command θthCOM and values of the engine rotational speed NE. Since the throttle valve opening command θthcOM is in one-to-one correspondence to the accelerator opening θap in this embodiment, the accelerator opening θap may be used instead of the throttle valve opening command θthCOM in the demand drive power map shown in FIG. 10.

In STEP6, the energy distribution control unit 15 calculates a corrective term θthADD for the throttle valve opening for generating the demand drive power POWERcom (θthADD=θthCOM−θthi (previous throttle valve opening)). In STEP7, the energy distribution control unit 15 determines a running status quantity VSTATUS depending on the vehicle speed Vcar detected by the vehicle speed sensor 119 and an extra output power POWERex of the engine 1 from a table for establishing running status quantities shown in FIG. 11.

The extra output power POWERex of the engine 1 is calculated according to the following equation (2):

$$POWERex = POWERcom - RUNRST \quad (2)$$

where RUNRST represents a running resistance to the hybrid vehicle, which is determined depending on the vehicle speed Vcar from a RUNRST table (not shown). The demand drive power POWERcom and the running resistance RUSRST are given in the unit of kW (kilowatt), for example.

Figure 11:
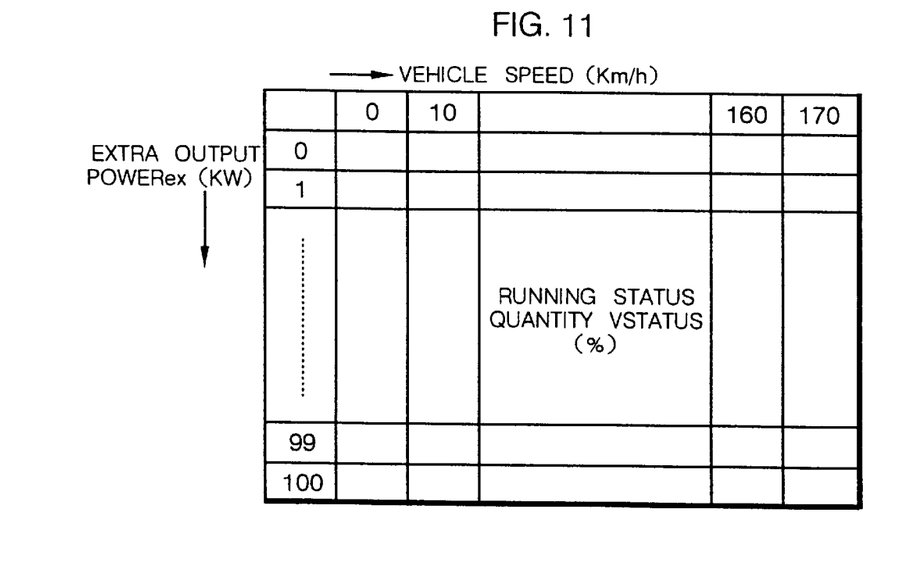
FIG. 11 is a diagram showing a table for establishing running status quantities.

The running status quantity VSTATUS determined by the vehicle speed Vcar and the extra output power POWERex corresponds to an assistive distribution ratio of the electric motor 3 with respect to the extra output power POWERex, and may be set to integral values (%) ranging from 0 to 200. If the running status quantity VSTATUS is "0", then the hybrid vehicle is in a running status not to be assisted by the electric motor 3, i.e., the hybrid vehicle is decelerating or cruising. If the running status quantity VSTATUS is greater than "0", then the hybrid vehicle is in a running status to be assisted by the electric motor 3.

In STEP8, the energy distribution control unit 15 decides whether the running status quantity VSTATUS is greater than "0" or not. If VSTATUS>0, i.e., if the hybrid vehicle is in a running status to be assisted by the electric motor 3, then the hybrid vehicle enters an assistive mode, and control goes from STEP8 to STEP9 shown in FIG. 6. If VSTATUS<0, i.e., if the hybrid vehicle is decelerating or cruising, then the hybrid vehicle enters a regenerative mode (i.e., a decelerating regenerative mode or a cruise charging mode), and control goes from STEP8 to STEP12 shown in FIG. 6.

In STEP9, the energy distribution control unit 15 calculates an electric motor output power POWERmot according to the following equation (3):

$$POWERmot = POWERcom \times PRATIO \times PRATIOth \times VSTATUS \quad (3)$$

In STEP10, the energy distribution control unit 15 converts the electric motor output power POWERmot as a target with a time constant into an electric motor torque command TRQcom.

Figure 12:
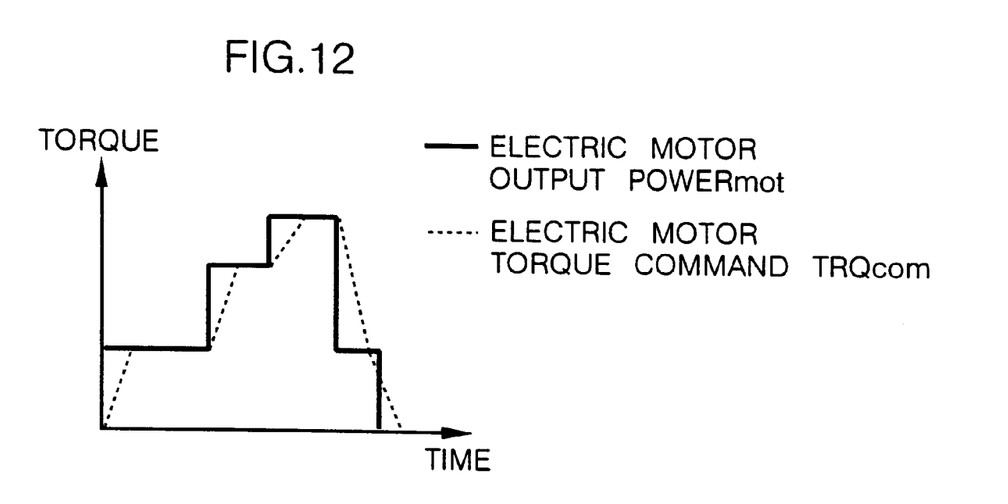
FIG. 12 is a diagram showing the relationship between the output power of the electric motor and a torque command for the electric motor.

FIG. 12 shows the relationship between the electric motor output power POWERmot and the electric motor torque command TRQcom. In FIG. 12, the solid-line curve illustrates the electric motor output power POWERmot as it changes with time, and the dotted-line curve illustrates the electric motor torque command TRQcom as it changes with time.

As can be seen from FIG. 12, the electric motor torque command TRQcom is controlled so as to approach the electric motor output power POWERmot as a target with a time constant, i.e., with a time delay. If the electric motor torque command TRQcom were established such that the electric motor 3 would generate the electric motor output power POWERmot immediately in response to the electric motor torque command TRQcom, then since an increase in the output power of the engine 1 would be delayed, the engine 1 would not be readied to accept the electric motor output power POWERmot immediately, with the result that the drivability of the hybrid vehicle would be impaired. It is necessary, therefore, to control the electric motor 3 to generate the electric motor output power POWERmot until the engine 1 becomes ready to accept the electric motor output power POWERmot.

In STEP11, the energy distribution control unit 15 calculates a corrective quantity θthASSIST for controlling a target value θthO for the throttle valve opening in a valve closing direction, depending on the electric motor torque command TRQcom. Thereafter, control goes from STEP11 to STEP18.

The corrective quantity θthASSIST serves to reduce the output power of the engine 1 by an amount commensurate with the increase in the output power of the electric motor 3 responsive to the electric motor torque command TRQcom. The corrective quantity θthASSIST is calculated for the following reasons:

When the target value θthO for the throttle valve opening is determined by the corrective term θthADD calculated in STEP6 from the throttle valve opening command θthCOM determined in STEP3 and the previous throttle valve opening θthi, and the throttle actuator 105 is controlled by the target value θthO, the demand drive power POWERcom is generated solely from the output power of the engine 1. Therefore, if the output power of the engine 1 were controlled with the target value θthO not corrected by the corrective quantity θthASSIST, and the electric motor 3 were controlled by the electric motor torque command TRQcom converted in STEP10, the sum of the output power of the engine 1 and the output power of the electric motor 3 would exceed the demand drive power POWERcom, resulting in a drive power greater than the demand drive power demanded by the driver. To avoid this problem, the output power of the engine 1 is reduced by an amount commensurate with the output power of the electric motor 3, and the corrective quantity θthASSIST is calculated such that the sum of the output power of the engine 1 and the output power of the electric motor 3 will be equalized to the demand drive power POWERcom. The target value θthO for the throttle valve 103 is then determined (θthO=θthi+θthADD−θthASSIST), and the throttle valve 103 is controlled according to the target value θthO for suppressing the output power of the engine 1.

Furthermore, when the demand drive power POWERcom is smaller than the electric motor output power POWERmot, since the target value θthO for the throttle valve 103 is equal to or smaller than the difference between the throttle valve opening command θthCOM and the corrective quantity θthASSIST (θthO≦θthCOM−θthASSIST), the target value θthO becomes nil (θthO=0). The demand drive power POWERcom is all generated by the electric motor 3, and the output power of the engine 1 is kept at a zero level.

When the remaining capacity of the ultracapacitor 14 is reduced thereby to reduce the output power of the electric motor 3, or the distribution ratio of the electric motor 3 based on the running status quantity VSTATUS is lowered, the corrective quantity θthASSIST is calculated so as to increase the output power of the engine 1 to make up for the reduction in the electric motor output power POWERmot. The target value θthO for the throttle valve 103 is then determined (θthO=θthi+θthADD+θthASSIST), and the output power of the engine 1 is controlled according to the target value θthO for generating the demand drive power POWERcom.

In response to a signal representing the target value θthO corresponding to the calculated corrective quantity θthASSIST from the engine control unit 11, the throttle actuator 105 controls the throttle valve 103 to control the output power of the engine 1 independently of operation of the accelerator pedal.

In STEP12, the energy distribution control unit 15 decides whether the present regenerative mode is the decelerating regenerative mode or the cruise charging mode. Specifically, the energy distribution control unit 15 makes such a mode decision by deciding whether a change Dap (=θapj (present value)−θapi (previous value) in the accelerator opening θap is smaller than a predetermined negative quantity DapD. Alternatively, the energy distribution control unit 15 may make such a mode decision based on the extra output power POWERex.

If Dap<DapD or POWERex<0 in STEP12, then the energy distribution control unit 15 judges the present regenerative mode as the decelerating regenerative mode, and sets the electric motor output power POWERmot to a decelerating regenerative output power POWERreg in STEP13. The decelerating regenerative output power POWERreg is calculated according to a decelerating regenerative processing routine (not shown).

In STEP14, the energy distribution control unit 15 reads an optimum target value θthO for the throttle valve opening in the decelerating regenerative mode, i.e., an optimum target value θthO for the throttle valve opening calculated in the decelerating regenerative processing routine. Thereafter, control proceeds to STEP19.

If Dap≧DapD or POWERex is nearly zero and VSTATUS=0 in STEP12, then the energy distribution control unit 15 judges the present regenerative mode as the cruise charging mode, and sets the electric motor output power POWERmot to a cruise charging output power POWERcrui in STEP15. The cruise charging output power POWERcrui is calculated according to a cruise charging processing routine (not shown).

In STEP16, the energy distribution control unit 15 converts the electric motor output power POWERmot as a target with a time constant into an electric motor torque command TRQcom. In STEP17, the energy distribution control unit 15 calculates a corrective quantity θthSUB for controlling a target value θthO for the throttle valve opening in a valve opening direction, depending on the electric motor torque command TRQcom. Thereafter, control goes from STEP17 to STEP18.

The corrective quantity θthSUB is calculated for the reasons that are opposite to the reasons for which the corrective quantity θthASSIST is calculated as described above.

The electric motor output power POWERmot in the cruise charging mode has a sign opposite to the sign of the electric motor output power POWERmot in the assistive mode. Specifically, in the cruise charging mode, the electric motor 3 is controlled in a direction to reduce the demand drive power POWERcom because of the electric motor torque command TRQcom which is negative. In order to maintain the demand drive power POWERcom in the cruise charging mode, it is necessary to make up for the output power of the electric motor 3 reduced by the electric motor torque command TRQcom, with the output power of the engine 1.

In STEP18, the energy distribution control unit 15 calculates the target value θthO for the throttle valve 103 according to the following equation (4):

$$\theta thO = \theta thi + \theta thADD - \theta thSUB \qquad (4)$$

In STEP19, the energy distribution control unit 15 decides whether or not the calculated target value θthO is equal to or greater than a predetermined reference value θthREF. If θthO<θthREF, the energy distribution control unit 15 decides whether or not an intake pipe absolute pressure Pba is equal to or smaller than a predetermined reference value PbaREF in STEP20.

If Pba>PbaREF, then the processing sequence shown in FIGS. 5 and 6 is finished. If θthO>θthREF in STEP19 or if Pba≦PbaREF in STEP20, then the energy distribution control unit 15 changes the speed reduction ratio of the transmission mechanism 4 to a lower speed reduction ratio in STEP21. Thereafter, the processing sequence shown in FIGS. 5 and 6 is finished.

When control goes to STEP21, the remaining capacity of the ultracapacitor 14 is reduced thereby to reduce the electric motor output power POWERmot, and the reduction in the electric motor output power POWERmot needs to be made up for by the engine 1, but the output power of the engine 1 cannot be increased anymore. At this time, the speed reduction ratio of the transmission mechanism 4 is changed to a lower speed reduction ratio to keep the torque produced by the drive axle 2 at a constant level, i.e., the same torque as before STEP21, to keep desired drivability of the hybrid vehicle.

An engine control process carried out by the engine control unit 11 will be described below.

Figure 13:
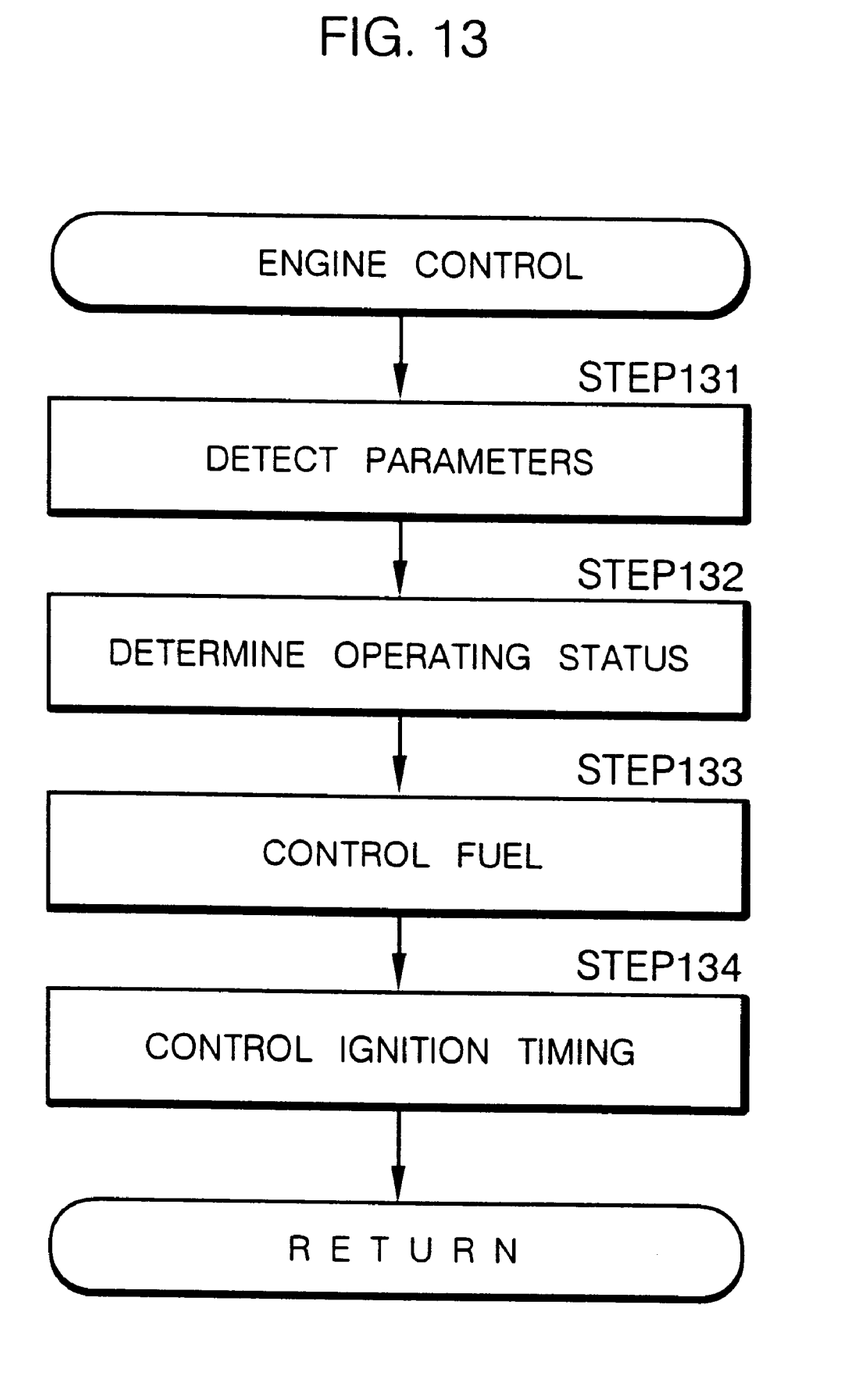
FIG. 13 is a flowchart of an overall engine control processing sequence.

FIG. 13 shows an overall engine control processing sequence, which is executed by the engine control unit 11 in each periodic cycle.

In FIG. 13, the engine control unit 11 detects various engine operating parameters including the engine rotational speed NE, the intake pipe absolute pressure Pba. etc. in STEP131. Then, the engine control unit 11 determines an engine operating status in STEP132, controls fuel to be supplied to the engine 1 in STEP133, and controls ignition timing of the engine 1 in STEP134.

In STEP133, the engine control unit 11 calculates an amount of fuel to be supplied to the engine 1 depending on the read or calculated target value θthO for the throttle valve opening.

While the ultracapacitor is employed as the electric energy storage unit in the illustrated embodiment, the electric energy storage unit may instead comprise a battery.

The throttle valve 103 whose opening is controlled by the electrically operated actuator 105 may be replaced with an ordinary throttle valve that is mechanically linked to the accelerator pedal. In such a modification, the amount of intake air depending on the output power of the electric motor may be controlled by a passage bypassing the throttle valve and a control valve disposed in the passage. On an engine having a solenoid-operated intake valve which can electromagnetically operated, rather than by a cam mechanism, the amount of intake air depending on the output power of the electric motor may be controlled by changing the valve opening period of the solenoid-operated intake valve.

The transmission mechanism 4 may comprise a continuously variable transmission mechanism whose speed reduction ratio can be continuously varied. With such a continuously variable transmission mechanism, the speed reduction ratio can be determined from the ratio of the rotational speed of the drive shaft of the continuously variable transmission mechanism to the rotational speed of the driven shaft thereof.

With the hybrid vehicle control system according to the present invention, a demand drive power is calculated depending on operating conditions of the hybrid vehicle, the remaining capacity of the electric energy storage unit is detected, an electric motor output power is calculated depending on the demand drive power and the remaining capacity, and the output power of the engine is corrected on the basis of the electric motor output power and the demand drive power. Therefore, when the electric motor output power is greater than the demand drive power, the output power of the engine can be reduced. Since the fuel consumption by the engine can be reduced without impairing the drivability of the hybrid vehicle, exhaust gases emitted from the engine can be reduced, and a voltage range and a capacity range of the electric energy storage unit for better charging and discharging efficiency can primarily be used.

Inasmuch as the electric motor output power is calculated also in view of a running load on the hybrid vehicle, the amount of assistive power can be increased when the running load is high and reduced when the running load is low. Therefore, the running performance of the hybrid vehicle can be improved, and the fuel consumption by the engine can be reduced.

When the demand drive power for the hybrid vehicle is smaller than the calculated electric motor output power, since the demand drive power is generated only by the electric motor, the fuel consumption by the engine can further be reduced.

Although a certain preferred embodiment of the present invention has been shown and described in detail, it should be understood that various changes and modifications may be made therein without departing from the scope of the appended claims.

What is claimed is:

1. A control system for controlling a hybrid vehicle having an engine for rotating a drive axle, an electric motor for assisting the engine in rotating the drive axle, and electric energy storage means for supplying electric energy to the electric motor, comprising:

demand drive power calculating means for calculating a demand drive power for the hybrid vehicle depending on operating conditions of the hybrid vehicle;

engine output power calculating means for calculating an output power of the engine which corresponds to the demand drive power;

remaining capacity detecting means for detecting a remaining capacity of the electric energy storage means;

electric motor output power calculating means for calculating an output power of the electric motor depending on said demand drive power and the remaining capacity of the electric energy storage means;

engine corrective quantity calculating means for calculating a corrective quantity to reduce the output power of the engine in order to equalize the sum of the calculated output power of the electric motor and the calculated output power of the engine to said demand drive power; and output control means for controlling a drive power of the electric motor based on the calculated output power of the electric motor and reducing the output power of the engine based on the calculated corrective quantity.

2. A control system according to claim 1, wherein said electric motor output power calculating means comprises means for calculating an output power of the electric motor depending on a running status quantity determined by said demand drive power, said remaining capacity of the electric energy storage means, a vehicle speed of the hybrid vehicle, and a running resistance to the hybrid vehicle.

3. A control system according to claim 1, wherein said output control means comprises means for generating said demand drive power solely with said electric motor when the calculated demand drive power is at most the calculated output power of the electric motor.

4. A control system according to claim 1, further comprising:

an intake air control valve for controlling an amount of intake air supplied to the engine; and an actuator for electrically controlling the opening of said intake air control valve;

said output control means comprising means for controlling said actuator to control the opening of said intake air control valve to increase the amount of intake air when the output power of the electric motor is reduced by a reduction in the remaining capacity of the electric energy storage means.

5. A control system according to claim 1, wherein said remaining capacity detecting means comprises means for detecting a remaining capacity of the electric energy storage means based on a charged quantity integrated value and a discharged quantity integrated value which are determined by integrating an output current and a charging current, respectively, of the electric energy storage means at each periodic interval.

6. A control system according to claim 1, further comprising:

speed reduction ratio control means for controlling the speed reduction ratio of a transmission mechanism of the hybrid vehicle, said speed reduction ratio control means comprising means for changing the speed reduction ratio of the transmission mechanism to a lower speed reduction ratio when the output power of the electric motor is reduced by a reduction in the remaining capacity of the electric energy storage means.

7. A control system according to claim 1, wherein said electric motor is operable in a regenerative mode for converting kinetic energy of the hybrid vehicle into electric energy, said output control means comprising decision means for instructing the electric motor to operate in the regenerative mode and means for increasing the output power of the engine based on the corrective quantity calculated by said engine corrective quantity calculating means when the electric motor operates in the regenerative mode.

8. A control system for controlling a hybrid vehicle having an engine for rotating a drive axle, an electric motor for assisting the engine in rotating the drive axle, and electric energy storage means for supplying electric energy to the electric motor, comprising:

demand drive power calculating means for calculating a demand drive power for the hybrid vehicle depending on operating conditions of the hybrid vehicle;

engine output power calculating means for calculating an output power of the engine which corresponds to the demand drive power;

operating parameter detecting means for detecting an operating parameter of the engine;

remaining capacity detecting means for detecting a remaining capacity of the electric energy storage means;

running status quantity establishing means for establishing a running status quantity depending on a running load on the hybrid vehicle;

electric motor output power calculating means for calculating an output power of the electric motor depending on said demand drive power, said operating parameter, said remaining capacity, and said running status quantity;

engine corrective quantity calculating means for calculating a corrective quantity for the output power of the engine in order to equalize the sum of the calculated output power of the electric motor and the calculated output power of the engine to said demand drive power;

electric motor output control means for controlling a drive power of the electric motor based on the calculated output power of the electric motor; and engine output control means for correcting the output power of the engine based on the calculated corrective quantity.

9. A control system according to claim 8, wherein said running status quantity establishing means comprises means for establishing a running status quantity based on a vehicle speed of the hybrid vehicle and a running resistance to the hybrid vehicle.

10. A control system according to claim 8, further comprising:

an intake air control valve for controlling an amount of intake air supplied to the engine; and an actuator for electrically controlling the opening of said intake air control valve;

said engine output control means comprising means for controlling said actuator to control the opening of said intake air control valve to increase the amount of intake air when the output power of the electric motor is reduced by a reduction in the remaining capacity of the electric energy storage means.

11. A control system according to claim 8, wherein said remaining capacity detecting means comprises means for detecting a remaining capacity of the electric energy storage means based on a charged quantity integrated value and a discharged quantity integrated value which are determined by integrating an output current and a charging current, respectively, of the electric energy storage means at each periodic interval.

12. A control system according to claim 8, further comprising:

an intake air control valve for controlling an amount of intake air supplied to the engine, wherein said operating parameter comprises either one of a vehicle speed of the hybrid vehicle, an engine rotational speed of the engine, and the opening of said intake air control valve.

13. A control system according to claim 8, further comprising:

speed reduction ratio control means for controlling the speed reduction ratio of a transmission mechanism of the hybrid vehicle, said speed reduction ratio control means comprising means for changing the speed reduction ratio of the transmission mechanism to a lower speed reduction ratio when the output power of the electric motor is reduced by a reduction in the remaining capacity of the electric energy storage means.

14. A control system according to claim 8, wherein said electric motor is operable in a regenerative mode for converting kinetic energy of the hybrid vehicle into electric energy, said output control means comprising decision means for instructing the electric motor to operate in the regenerative mode and means for increasing the output power of the engine based on the corrective quantity calculated by said engine corrective quantity calculating means when the electric motor operates in the regenerative mode.

* * * * *